United States Patent [19]
Varga

[11] 3,994,168
[45] Nov. 30, 1976

[54] FLUID METER

[76] Inventor: Andrew Varga, 1603 E. Cardeza St., Philadelphia, Pa. 19150

[22] Filed: Sept. 9, 1974

[21] Appl. No.: 504,073

Related U.S. Application Data

[60] Continuation of Ser. No. 338,042, March 5, 1973, abandoned, which is a continuation of Ser. No. 115,202, Feb. 16, 1971, abandoned, which is a division of Ser. No. 663,265, Aug. 25, 1967, Pat. No. 3,564,919.

[52] U.S. Cl. ................................................ 73/258
[51] Int. Cl.$^2$ ...................... G01F 1/075; G01F 3/12
[58] Field of Search ...................... 73/258, 198, 232

[56] References Cited
UNITED STATES PATENTS

| | | | |
|---|---|---|---|
| 2,529,481 | 11/1950 | Brewer | 73/231 |
| 2,731,025 | 1/1956 | Neuman et al. | 73/519 X |
| 2,991,652 | 7/1961 | Bassett | 73/258 |
| 3,039,311 | 6/1962 | Bassett | 73/258 |
| 3,156,115 | 11/1964 | Adelmann | 73/232 X |
| 3,442,126 | 5/1969 | Southall | 73/257 |
| 3,487,245 | 12/1969 | Pontis | 73/258 X |

*Primary Examiner*—James J. Gill
*Attorney, Agent, or Firm*—Howson and Howson

[57] ABSTRACT

Prior art, as noted in cited references, shows that the positive displacement fluid meter function is expanded by utilizing rotational drag speed sensing means for modulating electrical energy or pneumatic pressure inputs in consonance with rate of fluid flow; and electromechanical pulse generating means for remotely totalizing fluid flow. Prior art further establishes use of a magnetic coupling means for actuating the fluid meter indicator. The present invention is uniquely distinguishable from prior art by virtue of its structural features, added utility, reliability and singular common means for the actuation of electrical, electromechanical and fluidic pressure means for the remote indication of total flow, flow rates and flow control while simultaneously indicating total flow and flow rate locally as required. Structurally the present invention differs from prior art in that the means for increasing utility is adapted to the register means which in all applications is magnetically coupled for operation by conventional means well known in the art to the fluid flow responsive piston assembly within the removable measuring chamber mounted in the outer casing of the positive displacement type fluid meter. The conventional magnetic coupling comprises a meter magnet within the meter outer casing and a driven magnet within the register means mounted in the upper encasement portion of the outer casing. A second magnet within the register is connected by mechanical means to the register magnet and comprises the singular common means for the actuation of electrical, electromechanical and fluidic pressure means. Fluid meter reliability is increased in meter applications wherein remote total fluid flow and flow rate are confirmed by the local readouts of these factors in the same application.

14 Claims, 17 Drawing Figures

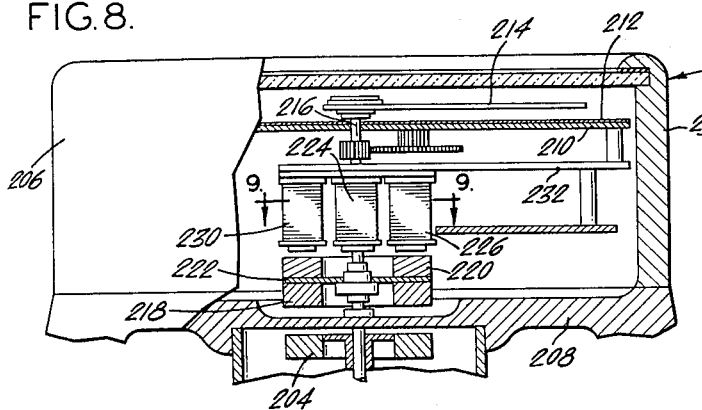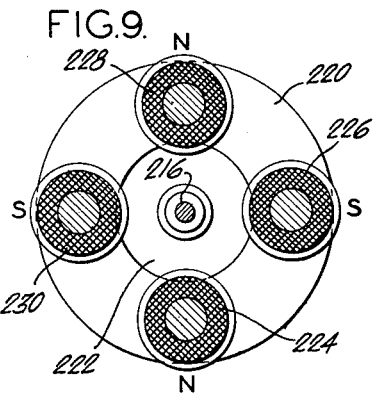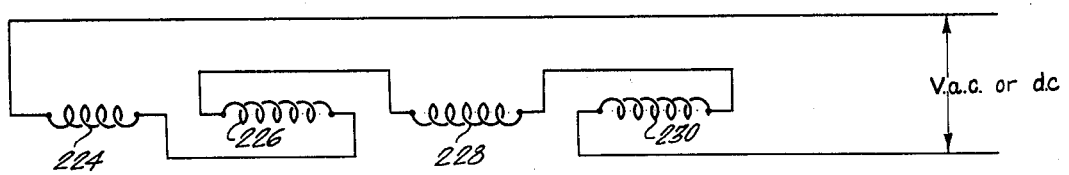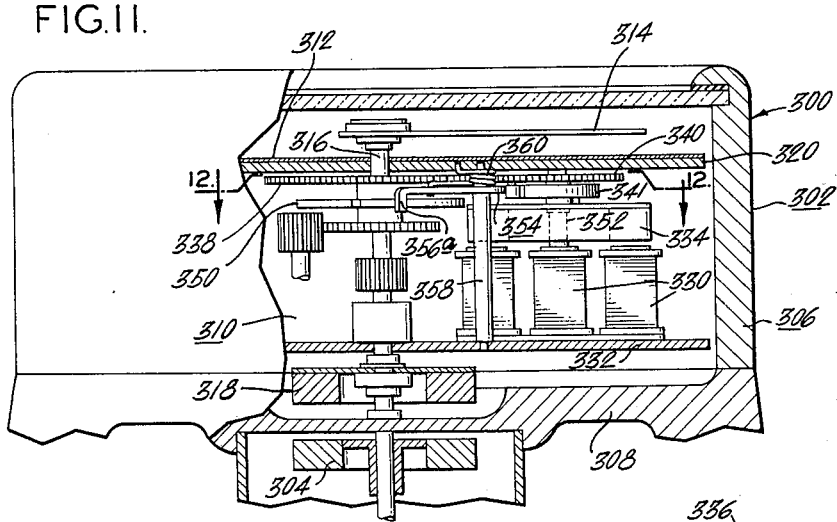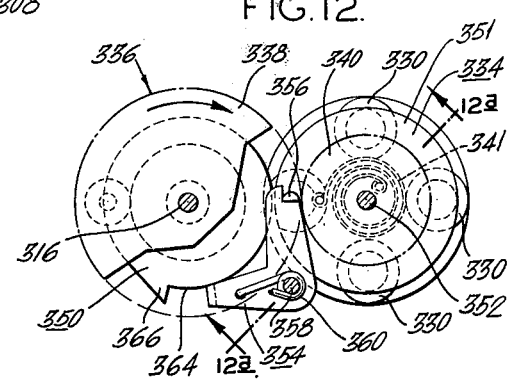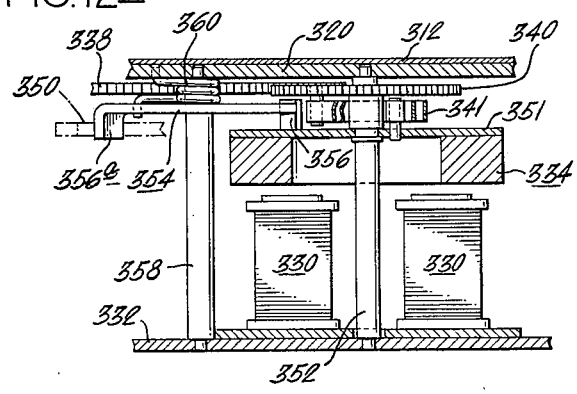

FLUID METER

This is a continuation of my prior application, Ser. No. 338,042, filed Mar. 5, 1973 entitled "FLUID METER", now abandoned which in turn is a continuation of my prior application, Ser. No. 115,202 filed Feb. 16, 1971 entitled "FLUID METER" now abandoned which in turn is a division of my prior application, Ser. No. 663,265 filed Aug. 25, 1967 entitled "FLUID METER" now U.S. Pat. No. 3,564,919.

The present invention relates to improvements in fluid meters of the positive displacement type and more particularly to improvements in fluid meters of the nutating disc type and applicable to the oscillating piston type.

These fluid meters generally comprise an outer casing having an inlet port and a discharge port communicating with a separable measuring chamber and a disc piston mounted in the chamber which moves with a nutating motion between inverted conical top and bottom walls of the chamber upon flow of a fluid through the measuring chamber. The nutating disc is usually operatively connected with a register mechanism which totals the flow through the measuring chamber in response to nutating motion of the disc. More specifically the nutating disc generally is carried by a ball support which engages in a seat at the center of the measuring chamber, the ball support mounting a spindle which describes a circular path as the disc nutates and transmits this motion usually through cooperating magnets to operate a counting pointer and a straight counter indicating total quantity of fluid through the meter.

The above type of positive displacement fluid meters are commonly used as water meters and in these applications as well as other applications, it is extremely essential that the meter have a high degree of measuring accuracy. However, it has been found that meters of this type on the market have limited reliability and accuracy particularly at low flow rates. This problem is evidenced by reason of the fact that the AWWA M6 standards consider a meter having 90% accuracy as an acceptable meter for use in the field. Obviously inaccuracy of the meter to register precise quantities of fluid such as water delivered, presents certain problems. If the indicated quantity of flow is less than the actual quantity, then, of course, the water suppliers are not being compensated for the precise quantity of water delivered. On the other hand, if the registered quantity is greater than the actual quantity delivered, then the user is paying more for water delivered than is just. In either event, the accuracy of the meter is an important factor. Measuring accuracy is just as important in other uses of this type of meter particularly where the meters are used in a system to meter predetermined quantities of a plurality of fluids used in a fluid mix, such as in blending expensive ingredients in critical batching operations, automatically proportioning systems in ready mix concrete plants and others.

A major factor contributing to inaccuracy of these meters, particularly at low flow rates, is the fact that as fluid flows through the meter, the nutating disc is thrust laterally toward the side of the chamber by virtue of the differential pressure which causes fluid flow. The utility as well as the user of the meter will benefit with a reduced pressure drop across the meter. It is an object of the invention to reduce flow energy loss through the meter to a minimum. The relatively large diameter support ball engaging the spherical seat in the chamber presents a large obstruction to fluid flow and increases the pressure drop through the measuring chamber. Furthermore, in the present meter designs the nutating disc assembly is comparatively heavy, that is, it usually has a weight greater than the specific gravity of the fluid being metered. Accordingly, a gravitational force is exerted on the ball seat. As a result, a comparatively large torque is required to cause nutation due to the combined gravitational and fluid forces. By contrast, in accordance with the present invention, the disc assembly is preferably made of substantially the same specific gravity as the fluid being metered so that the gravitational pull or force is reduced to zero. Further, the lateral force due to fluid flow is reduced in accordance with the present invention by reason of the fact that the nutating disc assembly is mounted on a small diameter bearing ball presenting less obstruction to fluid flow and therefore reducing the pressure drop in the measuring chamber. The net result is that the torque required to cause nutation is decreased and a greater measuring accuracy results at low flow rates.

The nutating torque $T_{n1}$ of a typical fluid meter may be expressed by $$T_{n1} = \mu_1 R_b \sqrt{F_d^2 + F_g^2}$$

where
$\mu_1$ = coefficient of friction between the ball and its seat in the fluid being metered,
$R_b$ = Radius of the nutating disc ball,
$F_d$ = Force due to differential pressure,
$F_g$ = Force due to differential of fluid and disc densities.

It is shown here that the nutating torque varies directly as the ball radius. Therefore, it is beneficial to reduce this to a practical minimum and simultaneously reduce the component $F_g$ to zero. The nutating torque $T_{n2}$ then becomes $$T_{n2} = \mu_2 R_p F_d$$

where $\mu_2$ = coefficient of friction of disc material against the ball pivot in the fluid being metered, $R_2$ = the radius of the ball pivot.

The advantage of a ball pivot with a small radius may be expressed as the ratio of the two torques $$\frac{T_{n2}}{T_{n1}} = \frac{\mu_2 R_p F_d}{\mu_1 R_b \sqrt{F_d^2 + F_g^2}}$$

Further, these fluid meters generally have a leakage path which is necessary and is defined by clearances between the nutating disc assembly and measuring chamber to prevent binding of the nutating disc in the measuring chamber. These clearances vary according to accumulation of manufacturing tolerances and also vary over a period of use due to wear of the parts.

Thus, even though the meter can be fairly accurately calibrated initially to compensate for the leakage path, over a period of use as the flow through the leakage increases, the measuring accuracy of the meter is affected. In accordance with the present invention a selectively adjustable leakage compensator port is incorporated and provides a control means to compensate for normal manufacturing tolerances and wear, the flow area of the compensator port being selectively adjustable over a period of use so that the continued high accuracy of the motor may be maintained. The total flow $Q_t$ through the meter is then expressed by $$Q_t = \sqrt{2G\Delta}(A_m C_m + A_L C_L + A_p C_p)$$

where
- $G$ = acceleration due to gravity,
- $\Delta P$ = differential pressure across the meter,
- $A_m$ = equivalent meter area,
- $A_L$ = equivalent leakage area,
- $A_p$ = compensator port area,
- $c_m$ = equivalent meter coefficient,
- $C_L$ = equivalent leakage coefficient,
- $C_p$ = calibration port coefficient.

$A_p$ is the only independent variable quantity in the expression and is therefore a means of calibration.

Other features of the invention include the provision of a novel means for converting flow rate through the measuring chamber to the register including a second magnet which is mounted on the register shaft and by means known in the art develops electrical energy as it rotates in a surrounding induction cup activating flow indication means whose supporting shaft is biased with a hair spring. By this arrangement, flow through the measuring chamber affects rotation of the cup until the hair spring torque is equal to the magnetic torque. This balance point is a reading for the given flow rate.

These and other objects of the present invention and the various features and details of the operation combine means based on principles known in the art and structurally adpted for functions hereinafter more fuly set forth with reference to the accompanying drawings, wherein:

FIG. 8 is a side elevational view partly in section of the register assembly of a motor illustrating another feature of the present invention;

FIG. 9 is an enlarged sectional view taken on lines 9—9 of FIG. 8;

FIG. 10 is an electrical schematic for the arrangement shown in FIGS. 8 and 9;

FIG. 11 is a side elevational view partly in section of a register assembly of a meter incorporating another feature of the present invention; and FIG. 12 is a view taken on lines 12—12 of FIG. 11;

FIG. 12a is a view taken on lines 12a—12a of FIG. 12.

Figure 1:
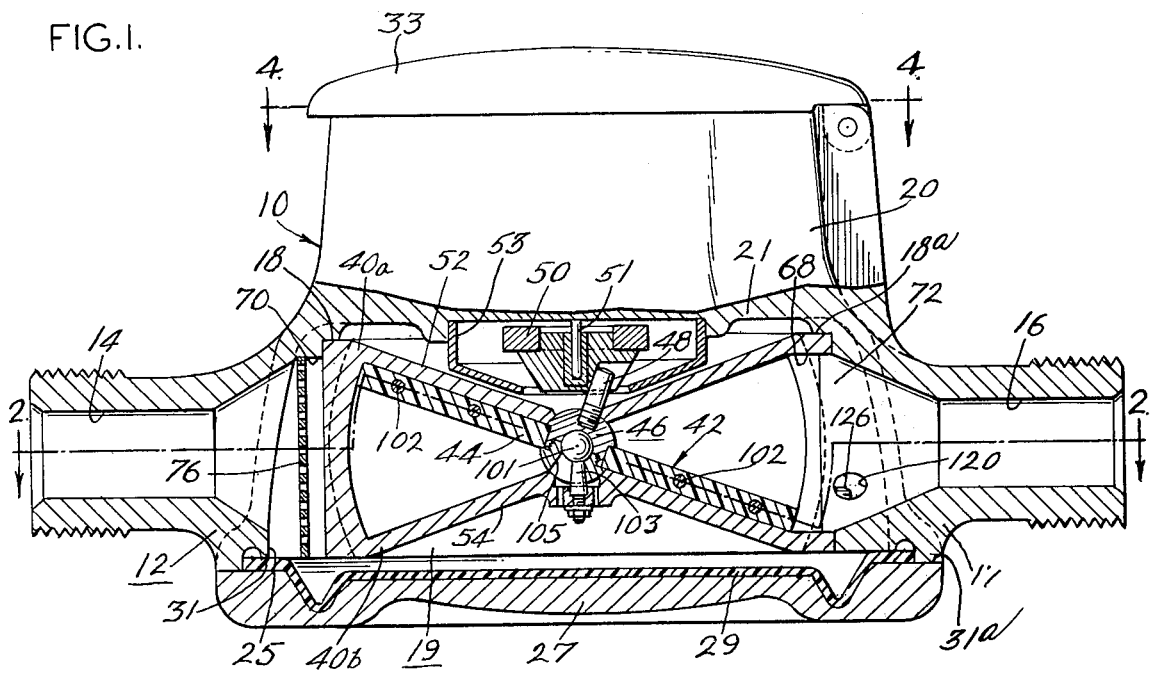
FIG. 1 is a side elevational view partly in section of a positive displacement flow meter constructed in accordance with the present invention.

Referring now to the drawings, and particularly to FIG. 1 thereof, there is illustrated a positive displacement type fluid meter made in accordance with the present invention and which is generally designated by the numeral 10. The meter comprises a metal outer casing 12 having diametrically opposed inlet and outlet ports 14 and 16 respectively, a lower section 17 which houses the measuring chamber unit 19 and an upper section 20 separated from the lower section by a non-magnetic dividing wall 21 which houses the sealed register assembly 23. The meter casing 12 is also provided with an access opening 25 in its bottom wall through which the measuring chamber unit 19 may be inserted into or removed from the casing, the opening 25 being closed by a cover 27 secured to the casing by a plurality of bolts screwed in tapped holes in bosses integral with the casing and circumferentially spaced about the access opening. The meter further includes a lid 33 hinged to the upper section 20 adapted to overlie transparent window 35 enclosing the dial plate 37. A frost plate linear 29 overlies the bottom cover 27 and has its outer peripheral edge tightly sealed by a circumferentially extending rib 31 adjacent the opening 25 in the periphery of the bottom wall of the meter casing. As illustrated in FIG. 1, the edge 31a of the casing defining the opening 25 in the bottom wall thereof projects downwardly further than the rib 31 spaced inwardly from the edge 31a. By this arrangement there is a metal to metal contact of the cover 27 and edge 31a in the assembled relation which minimizes the danger of overstressing the lugs holding the cover in place and yet permits a tight seal between the cover and casing. The cover lugs coincide with and are of the same configuration as the lugs 15 integral with meter casing 12 in FIG. 2. The projection of the edge 31a beyond the rib 31 is preferably less than the thickness of the liner 29 to insure a tight seal.

Figure 2:
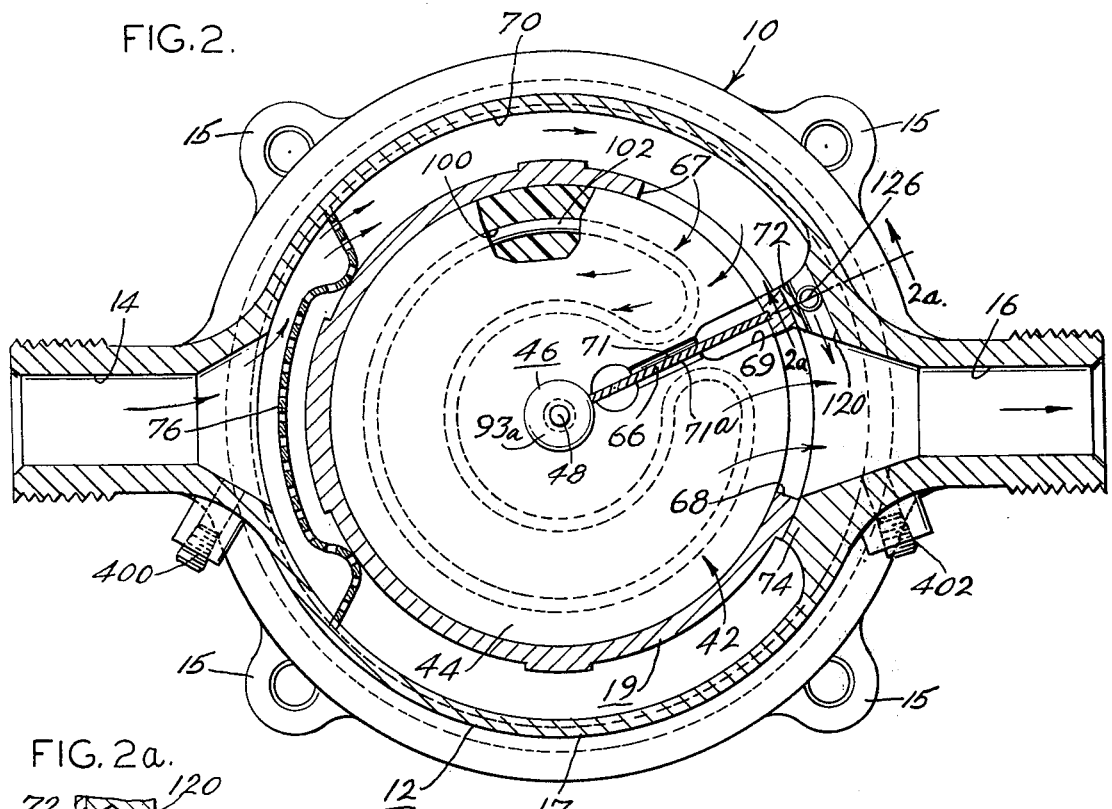
FIG. 2 is a sectional view taken on lines 2—2 of FIG. 1.
Figure 2A:
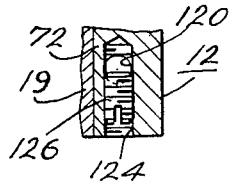
FIG. 2a is an enlarged sectional view of the leakage compensator port taken on lines 2a—2a of FIG. 2.

The measuring chamber unit 19 comprises in the present instance an upper housing 40a and a lower housing 40b and a nutating disc piston 42 mounted in the measuring chamber consisting of a circular disc 44 and a pivot ball 46 centrally of the disc. The ball 46 mounts a stem 48 adapted to rotate a meter magnet 50 pivotally mounted on pivot 51 and retained and protected from stray magnetic fields by magnetic shield 53 and in turn effects actuation of a register assembly 23 to measure flow rate and total flow. The upper housing 40a has a frustoconical wall 52 overlying a frusto-conical wall 54 of the lower section, the walls converging toward the center of the measuring chamber, the upper and lower housing sections having curved sidewalls whereby the peripheral edge of the disc is disposed closely adjacent the sidewalls during nutating movement in the chamber. The lower housing section has an upstanding diaphragm 66 extending radially from the center of the measuring chamber and separating the inlet opening 67 and the outlet opening 68 in the sidewall of the measuring chamber, the disc 44 having a radial cutout 69 to straddle the diaphragm. Cutout 69 forms two contacting pads 71 and 71a as close to the center of nutation as feasible. As illustrated in FIG. 2, the measuring chamber assembly is spaced inwardly from the main casing to define an annular flow chamber 70 which extends substantially the entire periphery of the measuring chamber assembly, the casing having inwardly directed wall portions 72 and 74 on opposite sides of the outlet port 16 which snugly contact the sidewalls of the measuring chamber unit so that the flow of fluid entering the inlet port 14 is directed to the inlet opening 67 in the measuring chamber. Annular opening 70 presents a fluid flow path free of obstruction thereby reducing the pressure drop. This is obtained by eliminating losses as in present meters. The measuring chamber unit 19 is seated and centered on a plurality of pads, two of which are shown at 18 and 18a. A strainer 76 is mounted in the flow passage or chamber 70 in front of the inlet port so that all fluid passing through the meter must pass through the strainer.

By this arrangement, as a fluid flows through the meter in the direction indicated by the arrow, the disc 44 is nutated which effects rotary movement of the stem 48 and in turn rotational movement of the meter magnet 50. As the meter magnet 50 rotates, the register magnet 78 in the sealed register assembly rotates which in turn effects rotation of flow indicator means the flow rate pointer 84 and counting pointer 86. The cooperative relationship of the meter magnet 50 and the register magnet 78 comprises a conventional magnetic coupling. Flow rate is indicated by pointer 84 which is secured to shaft 85 which mounts hairspring 87 and induction cup 88. The other end of the hairspring is secured to bracket 89. As register magnet 78 rotates cooperatively with meter magnet 50, it also rotates second magnet 91 since they are mounted on the same shaft. It is polarized for inducing electrical energy in the hairspring biased induction cup 88 known in the art which rotates against hairspring 87 until the hairspring torque and the electrical energy torques are equal for any flow rate within the meter range. The register assembly may also include a counter 90 to record total flow as explained in detail below.

Figure 3:
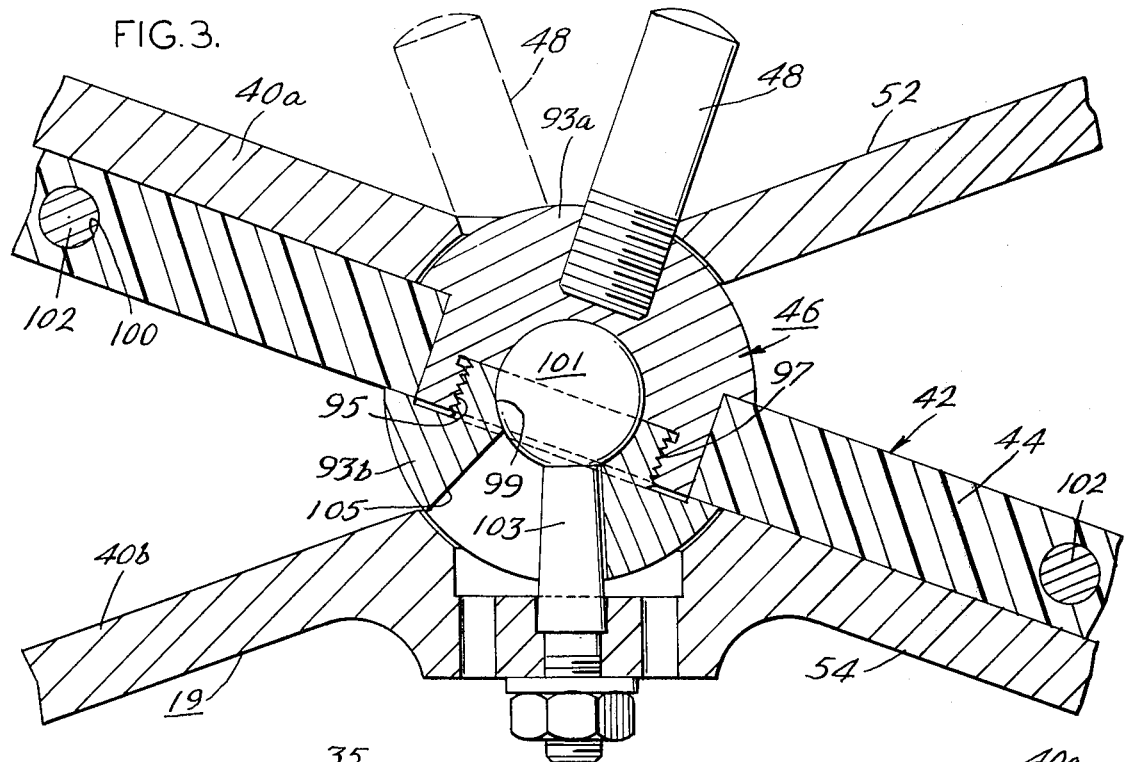
FIG. 3 is an enlarged fragmentary sectional view of the details of the pivot mounting arrangement for the nutating disc.

It has been found that the particular configuration and mounting arrangement of prior nutating disc assemblies in meters of this type produce unreliable readings for flow through the meter, particularly at low flow rates. The present invention provides a novel and improved nutating disc and mounting arrangement producing greater reliability and accuracy in meters of this type. To this end, the nutating piston assembly mounting arrangement comprises a two-piece pivot ball 46 comprised of an upper semi-spherical segment 93a and a lower segment 93b, the upper segment having a threaded bore 95 and the lower segment having a threaded stud 97 engageable in the bore. The ball sections have an internal spherical seat 99 which engage over a small ball pivot 101 having a stem 103 secured in the central portion of the lower housing section of the measuring chamber. The lower ball segment has an opening 105 therein to accommodate the stem 103 and permit the nutating motion of the disc. As illustrated in FIG. 3, by this arrangement the assembly pivots on the ball pivot 101 and there is a clearance between the ball segments 93a and 93b and the arcuate wall portions of the measuring chamber adjacent the pivot ball 46. Further, the disc 42 is preferably made of a lightweight material and one chosen to be of the same specific gravity as the fluid being metered. As illustrated, the disc may be provided with an internal hollow groove 100 to reduce weight and this may be accomplished by the use of lightweight tubing 102 which is molded internally of the disc. By this arrangement, the gravitational pull or force of the assembly is reduced to zero, thus leaving only the lateral force due to fluid flow. This lateral force is reduced considerably since the bearing ball is of reduced diameter and the pivot ball mounting is spaced from the arcuate walls of the measuring chamber. This produces less obstruction to fluid flow therefore, reducing the pressure drop in the measuring chamber, the lateral thrust being against the small diameter ball pivot. The net result is a decrease in the torque required to cause nutation and hence a greater accuracy for measuring the fluid flow particularly at low flow rates.

In the present instance as best illustrated in FIG. 1 the centerline of the inlet and outlet ports 14 and 16 is substantially aligned with a plane through the center of the measuring chamber to minimize pressure drop across the meter.

Figure 3A:
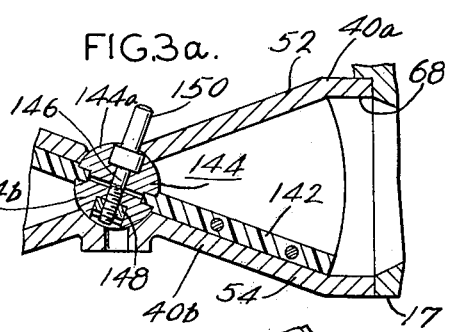
FIG. 3a is a fragmentary sectional view of a modified form of the nutating disc.
Figure 4A:
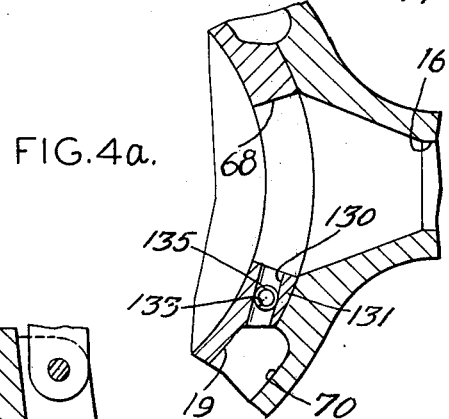
FIG. 4a is a fragmentary sectional view of an alternate leakage compensator port.
Figure 5:
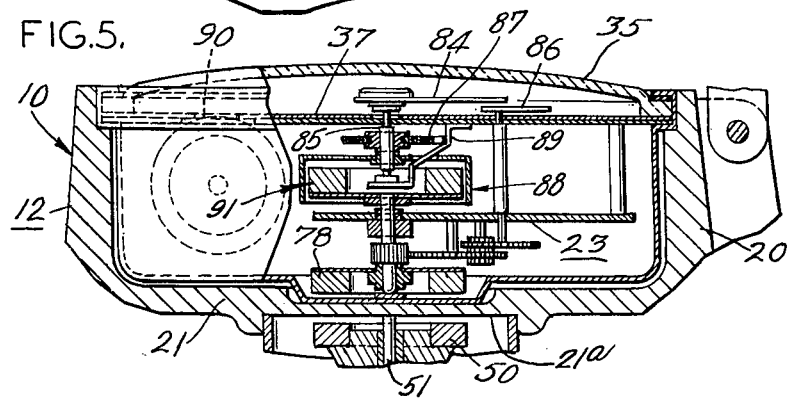
FIG. 5 is an enlarged sectional view taken on lines 5—5 of FIG. 4 showing the register mechanism.

FIG. 3a shows a modified form of a nutating piston assembly in accordance with the present invention. In this embodiment the piston assembly includes a circular disc 142, and a pivot ball 144 comprising two segments 144a and 144b which in the assembled relation have a circumferentially extending groove within which the disc 142 is supported. The segments of the pivot ball are held together by means of a screw element 146 and a nut 148, the screw element having a radial stem extension 150 which engages in a slot in the motor magnet assembly In this embodiment the pivot ball 144 engages the seat defined by the central portion of the walls of the measuring chamber, the disc assembly having substantially the same specific gravity as the fluid being metered. It is noted that in this arrangement the disc is also readily replaceable so that it may be interchanged when the meter is used for different types of fluid. By this arrangement as discussed above in detail, gravitational force is eliminated and thus, the meter operates more accurately particularly at low flow rates.

Another feature of the present invention is the provision of means permitting easy and accurate calibration of the meter. Total flow of fluid through the meter generally takes two paths, one path through the measuring chamber and nutating disc assembly and the other path through leakage areas in the meter. The leakage areas are clearances between the outer peripheral edge of the nutating disc 42 and the curved side walls of the measuring chamber and also the clearances at the pivot ball, these clearances being provided to permit proper operation of the nutating disc 42. However, the total flow area of the leakage path varies from one meter to the next depending on the accumulation of manufacturing tolerances. To maintain the manufacturing tolerances for all of the meters within precise limits would be extremely costly. Flow through the leakage paths is taken into consideration in initial calibration of the meter, it being noted that the present practice is to employ change gears or registers with variable gear trains for all meters. Of course, the result is that a stock of gears must be maintained for calibration of a plurality of meters where total flow through the leakage paths differ and the various meters have different accuracies. In accordance with the present invention, means is provided for precisely calibrating each meter after manufacture to provide high accuracy notwithstanding differences in the flow areas through the leakage paths and also for recalibrating the meters after a period of use during which time the flow area of the leakage paths may change. To this end a compensator port 120 is provided in the wall 72 of the casing which communicates at one end with the flow chamber 70 and at its other end with the discharge port 16. A cross port 124 intersects the compensator port 120 and has an adjustable set screw 126 mounted therein which is selectively movable in the cross port to vary the flow area through the compensator port 120. The adjustable compensator port 120 in effect defines another branch of the leakage system which is selectively variable so that if the other branches of the leakage systems vary due to manufacturing tolerances or wear of parts, the total flow area of the leakage system may be maintained constant simply by varying flow area of the compensator port 120. By this arrangement, the total flow path leakage for a plurality of meters having different manufacturing tolerances may be made uniform simply by adjusting the flow area through the compensator port 120. Further after a period of normal use, if the flow area of the normal leakage paths increases, the flow area through the leakage compensator port 120 may be reduced so that the measuring capacity is maintained accurate and reliable without changing the nominal leakage factor built into all of the meters.

Figure 4:
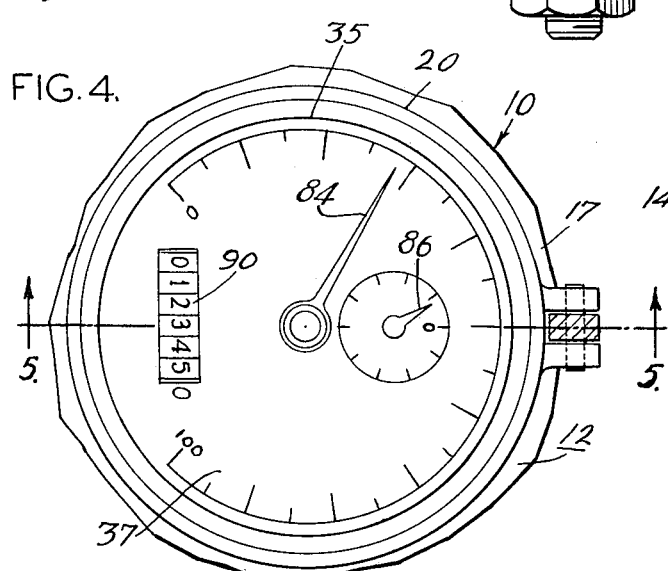
FIG. 4 is a sectional view taken on lines 4—4 of FIG. 1 showing the register face.

A modified form of leakage compensator port is illustrated in FIG. 4 a. In this embodiment the leakage compensator port 130 is provided in an extended outer wall portion 131 of the measuring chamber sidewall separating the flow chamber 70 and the discharge port 16. The cross port 133 intersects the leakage compensator port 130, and an adjustable set screw 135 is mounted therein so that the flow area of the leakage compensator port 130 may be selectively varied.

Figure 6:
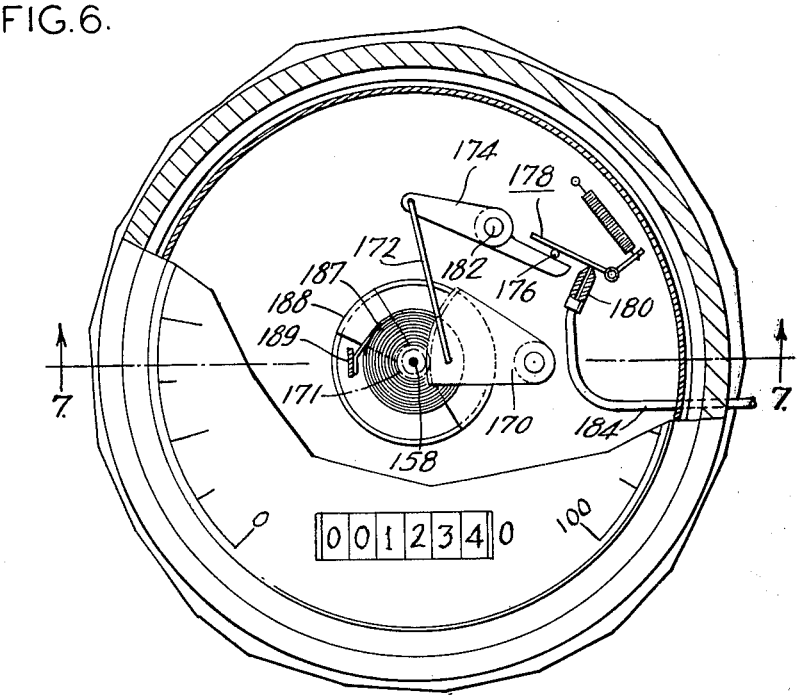
FIG. 6 is a plan view partly in section illustrating a pneumatic arrangement for remote reading and control of flow rate in a meter.
Figure 7:
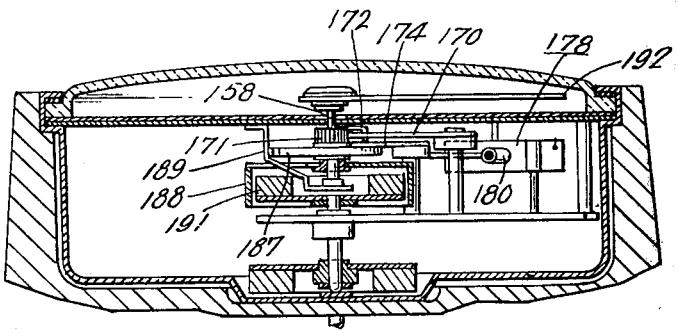
FIG. 7 is a sectional view taken on lines 7—7 of FIG. 6.
Figure 5A:
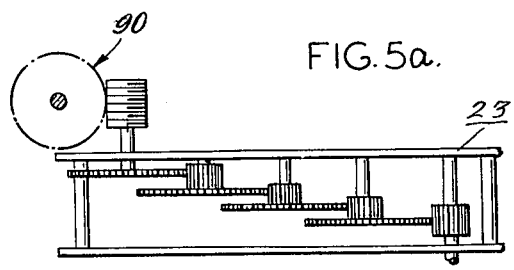
FIG. 5a is a schematic illustration showing the gear train for actuating the counter registering total flow.

Still another feature of the present invention is the provision of means known in the art for pneumatically reducing flow rate of the meter at a remote location. To this end, as illustrated in FIGS. 6 and 7 there is provided a register magnet which cooperatively rotates with the meter magnet and drives second magent 191 inducing in induction cup 188 and causing the induction cup to rotate against hairspring 187 which is secured to shaft 158 and thereby causes rotation of a segmental gear 170 pivotally mounted in the register housing which meshes with a small gear 171 on the pointer shaft 158, the segmental gear being connected by a connecting link 172 to one end of a pivotally mounted lever 174. The opposite end of the lever 174 mounts a range adjusting pin 176 which bears against a spring biased flopper 178. A nozzle 180 having a discharge opening confronting flapper 178 of the linkage is connected through a pneumatic line 184 in a manner well known in the art to a mechanism at a remote location for sensing pressure changes at the nozzle tip. By this arrangment, as the pointer shaft 158 rotates in response to increased fluid flow through the meter, the segmental gear 170 due to meshing relation with the pinion 171 rotates, for example, in a counterclockwise direction with respect to FIG. 6 which in turn effects pivotal movement of the lever 174 and flapper 178 thereby to vary the gap between the nozzle tip 180 and the flapper 178. The resulting pressure change is fed back to penumatically positioned (means not shown) pivot 182 on which lever 174 is mounted. Pointer 192 mounted on shaft 158 indicates fluid flow rate, the shaft being rotated until the balance point of electrical energy torques and hairspring torque is reached for any flow rate within the meter range. A remote mechanism senses the pressure change and in turn converts this to indicate the flow rate through the meter. The remote means may be adapted to control flow rate or by the addition of a variable act point mechanism, (means not shown) control may be effected within the fluid meter by means well known in the art. The register is not sealed in this application.

There is illustrated in FIGS. 8–10 a meter generally designated by the numeral 200 incorporating still another feature of the present invention. In accordance with this embodiment of the invention there is provided a combined register and voltage generator which develops a voltage output proportional to flow rate which output may be transmitted to a voltmeter, millivolt meter, potentiometer or electronic data processing equipment at a remote location.

The meter 200 includes a metal outer casing 202 having a lower section (not shown) which houses a measuring chamber unit operatively connected to a meter magnet 204 and an upper section 206 separated from the lower section by a non-magnetic dividing wall 208, the upper section housing the register assembly broadly designated by the numeral 210. The upper section includes a pointer 214 mounted on a rotatably mounted pointer shaft 216, operable to sweep a dial plate 212 to read amount of flow.

The shaft 216 mounts at its lower end the register magnet 218 which overlies the meter magnet 204 whereby rotation of the meter magnet effects rotation of the register magnet 218 and the pointer 214 to give a visual indication of total flow in cooperative relation with counter 90.

In accordance with this embodiment of the invention, there is provided a second magnet 220 of ring-like form which overlies the register magnet and is positioned on the upper face of the disc 222 supporting the second magnet and register magnet on the shaft 216. The second magnet 220, in the present instance, is a four-pole ring-type member made of permanent magnetic material whose upper face has diametrically opposed north poles and diametrically opposed south poles intermediate the north poles. In the present instance, induction means four pick up coils 224, 226, 228 and 230 are mounted in a ring-like array on a support plate 232, the axis of the coils overlying the magnet in a conventional manner as illustrated in FIG. 9. As shown in FIG. 10, successive coils are connected in opposite polarities and alternate coils are connected in the same polarity whereby the pulses are additive to produce a voltage in one direction. Thus, as the second magnet 220 rotates relative to the fixed coils electrical engery, a voltage is induced in the coils which through fluid indicator means, such as a suitable pick up such as a voltmeter may be converted to indicate the flow rate. It is noted that at increased speed of rotation of the second magnet, more voltage is generated that is, the voltage output increases in the same sense with speed of rotation of the second magnet. Even though the arrangement shown in FIG. 10 is one wherein the voltages are additive and are alternating, the coils may be connected in a manner to produce direct current output.

There is illustrated in FIGS. 11 and 12 another embodiment of the present invention incorporating means for reading total flow of a meter at a remote location.

The meter 300 includes a metal outer casing 302 having a lower section (not shown) which houses a measuring chamber unit operatively connected to a meter magnet 304 and an integrally or cooperatively mounted upper section 306 separated from the lower section by a non-magnetic dividing wall 308, the upper section housing the combined register assembly and voltage generator broadly designated by the numeral 310. The upper section includes a pointer 314 mounted on a rotatably mounted pointer shaft 316 operable to sweep a dial plate 312 to indicate total flow in combination with a straight reading counter. The shaft 316 mounts at its lower end the register magnet 318 which overlies the meter magnet 304 whereby rotation of the meter magnet effects rotation of the register magnet 318 and the pointer 314 to give a visual indication of total flow.

In accordance with this embodiment of the invention, there is provided induction means a plurality of coils 330 in the present instance, four coils mounted on a support plate 332 in the register and arranged in a circular array. A second magnet 334 overlies the coils in a conventional cooperative manner and is of the four-pole ring-type. The second magnet 334 is mounted for rotation relative to the coils by a gear train broadly designated by the numeral 336 including a drive gear 338 carried by the shaft 316 and driven gear 340 rotatably supported on shaft 352 below the upper register plate 320, which as illustrated, meshes with the drive gear 338. The driven gear 340 is connected to the second magnet through a coil spring 341 and in the present instance is freely rotatable on shaft 352. In this arrangement, the second magnet 334, mounted on a disc 351 which in turn is secured to shaft 352, is restrained from rotating while, during flow of fluid through the meter, the spring 341 stores energy as the drive and driven gears are rotating in response to fluid flow. When the cam 350 which is also secured to shaft 316 is caused to rotate, it releases the second magnet and the spring energy is released to rapidly rotate the second magnet over the coils developing electrical energy or a voltage of sufficient magnitude and duration to operate a fluid indicator means, an electrical counter which is mounted at a remote location and connected to the coils by a pair of shielded transmission wires. The arrangement may be connected for A.C. or D.C. operated sclenoids. Further the compatable output of the coils may be used for electronic data processing systems for integrating, indicating and flow control functions.

At low flow rates noise and other side effects might disturb an output signal requiring expensive transmission system whereas in the present instance slow flows through the meter are integrated and read at the remote read-out instantaneously and this system in effect climinates the need for amplifiers.

The specific details of the means connecting the driven gear 340 to the second magnet 334 is shown in FIG. 12a. As illustrated therein, the second magnet 334 is mounted on a disc 351 which in turn is secured to shaft 352 rotatably journalled in upper register plate 320 and plate 332 centrally of the coils facilitating rotation of the second magnet relative to the coils. As illustrated, one end of the coil spring 341 is connected to the driven gear 340 and the opposite end is connected to the disc 351. Thus, in operation if the drive gear 338 rotates in a clockwise direction, with respect to FIG. 12, driven gear 340 rotates counterclockwise and stores energy in coil spring 341 since the second magnet assembly is restrained from rotation by trip lever 354 which engages stop pin 356 rigidly attached to disc 351. Trip lever 354 is secured to shaft 358 which mounts torsion spring 360, one end of which is attached to the trip lever and the other end is anchored to upper register plate 320. Trip lever 354 has a turned down extension 356 which rides on the land 364 of cam 350 which is secured to shaft 316 and rotates with the shaft in response to fluid flow. After a predetermined quantity of fluid has passed through the meter the raised lug 366 on cam 350 contacts extension 366 on trip lever 354 causing it to allow spring 341 to unwind and rotate the second magnet relative to the coils thereby inducing a voltage in the coils. In this period, the raised lug 366 has passed by extension 356a on the trip lever and allows the trip lever to partially rotate clockwise to restrain the magnet assembly until sufficient flow has passed through the meter for the next flow unit. This embodiment does not develop a minute voltage during the time that energy is being stored in spring 341.

Flow rate through the measuring chamber of the meter is related to the differential in inlet and outlet pressures. More specifically, flow rate is proportional to the square root of this differential pressure. Another feature of the present invention is the provision of pressure taps 400 and 402 in the meter line or in the spud connections whereby differential pressure instrumentation may be connected and used for transmission, control and electronic data processing functions in relation to flow rate and totalizing.

While particular embodiments of the present invention have been illustrated and described herein, it is to be understood that changes and modifications may be made within the scope of the following claims.

I claim:

1. In the combination of a positive displacement type fluid meter comprising an outer casing including inlet and outlet ports communicating with a measuring chamber mounted within said outer casing, a piston movable in said measuring chamber in response to fluid flow therethrough, said outer casing having an upper section portion isolated from said measuring chamber and incorporating register assembly a meter magnet rotatably actuated by said piston assembly in response to fluid flow through the measuring chamber, a register magnet in said register assembly magnetically coupled to said meter magnet and rotatable thereby, a counter for reading total flow and a counting pointer mechanically coupled to and actuated by said register magnet, the improvement comprising a polarized second magnet in said register assembly mechanically coupled to the register magnet and rotatable therewith, induction means in said register assembly cooperatively associated with said second magnet constructed and arranged whereby rotation of said second magnet is the sole means operable to induce electrical energy in said induction means, thereby actuating fluid indicator means, the amplitude and duration of said induced electrical energy being directly related to flow of fluid through the meter.

2. A fluid meter as claimed in claim 1 wherein the said induction means comprises a spring biased induction cup, coaxially mounted with respect to said second magnet and rotatably responsive to small magnetically induced torques between said induction cup and said second magnet requiring minimal fluid flow energy to angularly displace said spring biased induction cup and develop therein an equal opposing torque establishing a point of balance linearly related to fluid flow rate through said measuring chamber in which combination said fluid flow rate is indicated by pointer means affixed to said induction cup cooperable with a calibrated scale within said register means simultaneously with the indication of total flow.

3. A fluid meter as claimed in claim 2 wherein the said register means incorporated means comprising a pivotally mounted lever mechanically coupled for actuation by said spring biased induction cup, a spring biased flapper pivotally mounted and actuated by said lever in correspondence with rate of fluid flow and a nozzle having a discharge opening confronting said flapper and connected to a pneumatic line from remote means for sensing flow rate related pneumatic pressures at the nozzle tip.

4. A fluid meter as claimed in claim 3 wherein said register means includes a variable set point mechanism to effect fluid flow rate control.

5. A fluid meter as claimed in claim 1 wherein the said induction means comprises a plurality of coils disposed in ring-like array mounted coaxially with respect to said second magnet to induce electrical energy for actuating a remote fluid indicator or electrical means while indicating total fluid flow locally.

6. A fluid meter as claimed in claim 5 wherein said electrical energy for actuating a remote electrical means is proportional to fluid flow rate and said remote electrical means displays fluid flow rate remotely.

7. A fluid meter as claimed in claim 6 wherein the said electrical voltage proportional to fluid flow is alternating.

8. A fluid meter as claimed in claim 6 wherein the said electrical voltage proportional to fluid flow is direct current.

9. A fluid meter as claimed in claim 5 wherein said remote electrical means is a digital type for electronic data processing.

10. A fluid meter as claimed in claim 5 wherein said electrical means is an analogue type for electronic data processing.

11. A fluid meter as claimed in claim 5 wherein said second magnet is driven by said register magnet by mechanical means comprising a gear train restrained from rotation during a period of predetermined total fluid flow during which energy is stored in a spring member portion of said mechanical means, wherein the stored spring energy is released at said predetermined total fluid flow to rapidly rotate the said second magnet to induce electrical energy in said plurality of coils of sufficient magnitude and duration to activate fluid indicator means such as an electrical counter remotely simultaneously with indicating total fluid flow locally.

12. A fluid meter as claimed in claim 11 wherein the induce electrical energy output voltage of the register means is electrically connected to said electrical counter at a remote location by a pair of transmission wires shielded against extraneous electrical interferences.

13. A fluid meter as claimed in claim 1 wherein said outer casing includes hydrostatic pressure taps in the meter spud connections providing a means for hydrostatically actuating remote differential pressure instrumentation simultaneously with local indication of total flow and flow rate within the register means.

14. A fluid meter as claimed in claim 13 wherein said differential pressure instrumentation combination with the fluid meter comprises a system for totalizing flow, measuring flow rate and flow control.

* * * * *